United States Patent Office 3,493,714
Patented Feb. 3, 1970

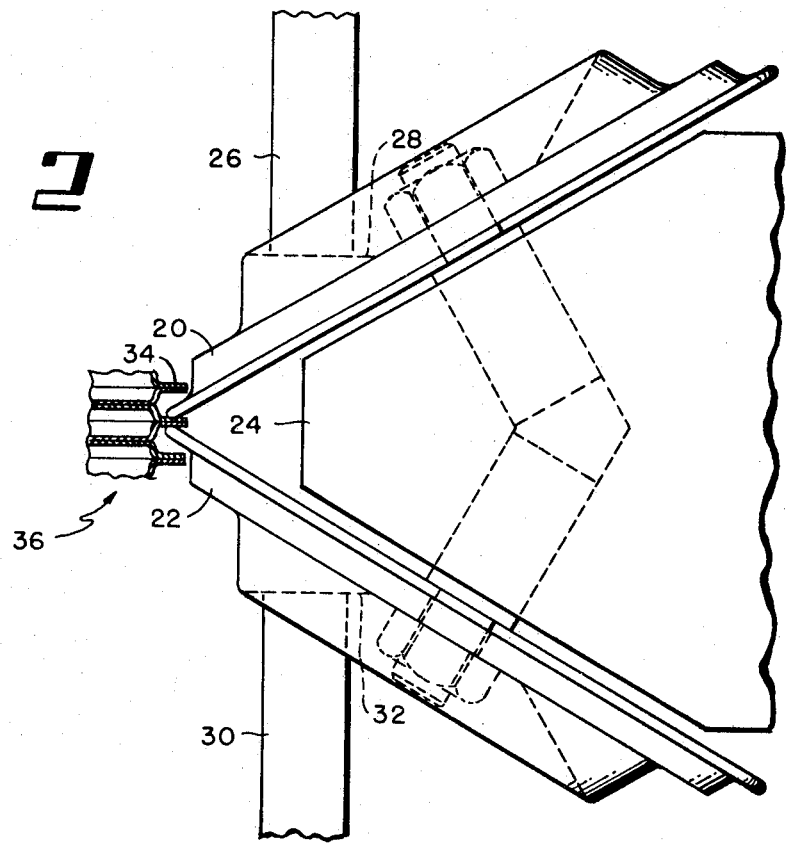
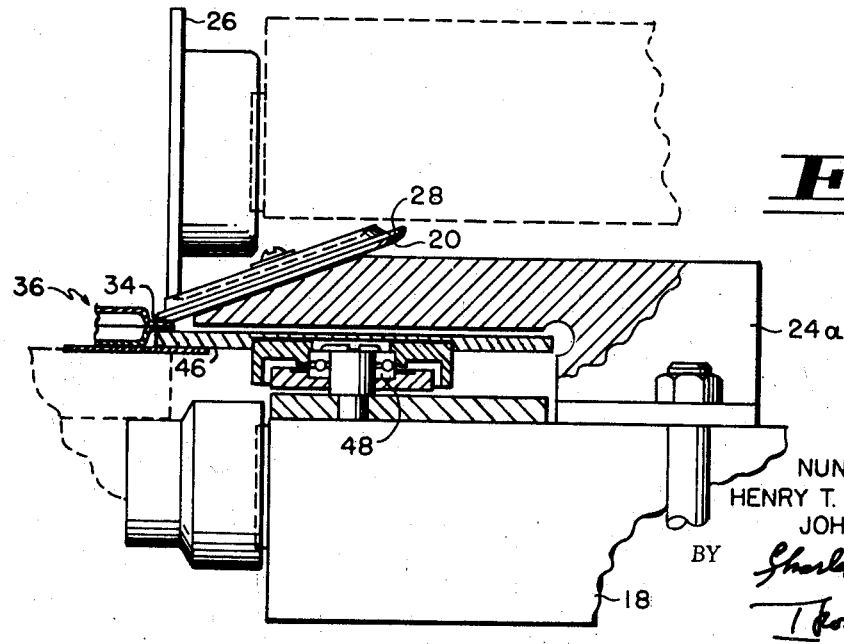
INVENTORS.
NUNZIE DeCAPUA
HENRY T. SIENKIEWICZ
JOHN J. MARTIN
ATTORNEYS.

3,493,714
ELECTRODE ARRANGEMENT FOR SEAM WELDING APPARATUS
John J. Martin, Milford, and Nunzie L. De Capua and Henry T. Sienkiewicz, Trumbull, Conn., assignors to Avco Corporation, Stratford, Conn., a corporation of Delaware
Filed Dec. 1, 1967, Ser. No. 687,194
Int. Cl. B23k 11/06
U.S. Cl. 219—81      5 Claims

ABSTRACT OF THE DISCLOSURE

A resistance welder is provided with two intermediate roller electrodes which are disposed at an acute angle for seam welding. The two intermediate roller electrodes are driven by two driving rollers which exert a positive pressure on the intermediate roller electrodes adjacent the electrode periphery. The arrangement permits the efficient seam welding of a thin sheet metal bellows-type structure.

BACKGROUND OF THE INVENTION

Figure 1:
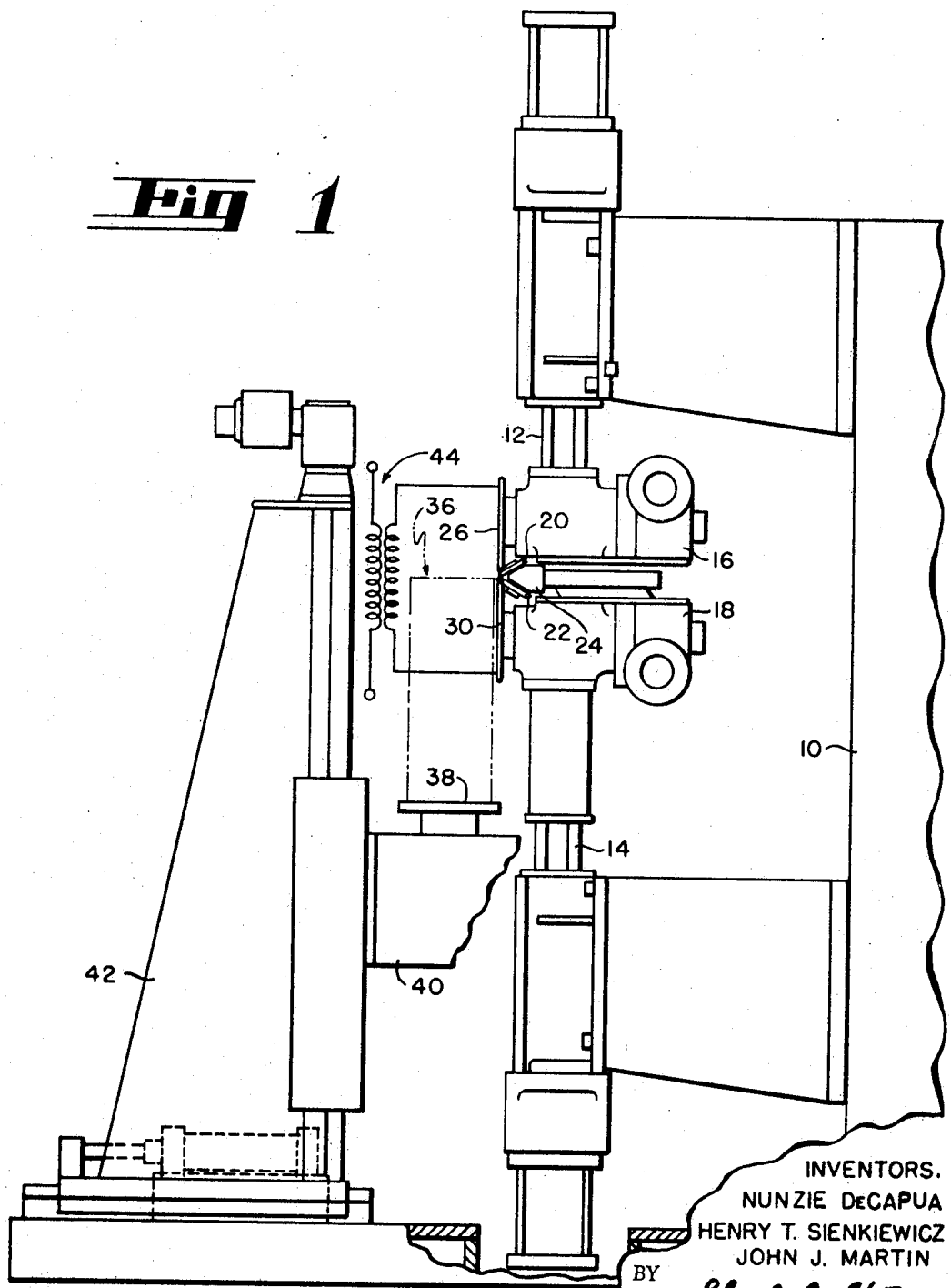

The prior art discloses many devices for seam welding. However, none is suitable for precision seam welding in heretofore inaccessible spaces, such as those found in a bellows-type structure. The prior art has disposed a conventional single set of roller electrodes at an acute angle so as to enable the contacting peripheries of the electrodes to fit within a confined space. However, the prior art does not provide means for maintaining the roller electrodes under pressure, and at the same time permit the use of very thin intermediate roller electrodes and accessibility to the work area. Applicants' invention overcomes the deficiencies of such prior art by incorporating two driving rollers which drive the intermediate roller electrodes adjacent their peripheries and thus permit the application of the pressure forces and current required for efficient welding. Because of the location of the support for the driven rollers, between the work and the peripheries of the electrodes, the peripheries of the roller electrodes are insertable into a heretofore inaccessible space.

THE DRAWINGS

FIGURES 1 and 2 of the drawings show a first embodiment of the invention; and
FIGURE 3 shows a modified version of the invention.

DETAILED DESCRIPTION OF THE INVENTION

The welding apparatus of FIGURE 1 is generally conventional and it includes a stand 10 conventionally supporting two coaxial vertically oriented slidable columns 12 and 14. The column 12 supports an upper carriage 16 while the column 14 supports a lower carriage 18.

The lower carriage 18 carries a pair of roller electrodes 20 and 22 rotatably supported on a nylon wedge 24. The upper carriage 16 also carries a driving roller 26 which runs in a race 28 integral with the roller electrode 20. The lower carriage 18 carries a second idler roller 30 which runs in a race 32 integral with the roller electrode 22 when the carriage 16 is lowered into welding position.

Both roller electrodes 20 and 22 are rotatably secured to the nylon wedge 24. However, the tolerances are such that a small amount of pivotal motion is permitted to provide for separation of the electrodes at their contacting peripheries. This enables the insertion of flange 34 of the work, generally indicated at 36. In the case illustrated, the work is a thin sheet metal bellows-type structure.

The work 36 is carried on a rotatable platform 38 which may be elevated into position by means of a conventional carriage 40 supported from a stand 42.

The electrical energy for welding is derived from any conventional power source (not shown) and is applied through a transformer schematically shown at 44 to the electrodes 20 and 22 through the driving rollers 26 and 30. While not shown in the drawings, it will be understood that the electrical connections are made through the machinery in a conventional manner and that the various mechanical elements are appropriately insulated for this purpose in any suitable manner.

In operation, the driving rollers 26 and 30 are pressed against the races 28 and 32 of the electrodes 20 and 22 to put them under sufficient pressure for efficient welding. This is accomplished by vertically positioning either the carriage 18 or the carriage 16 or both. In practice this is done by hydraulic means. In addition, the rollers 26 and 30 are rotatably driven through appropriate gearing by means of an electric motor (not shown). This serves to rotate the electrodes which in turn drive the work, in this case in a rotatable path, to weld a circular seam.

The embodiment of FIGURE 3 differs from that of FIGURE 1 in that the nylon wedge 24a insulatedly supports only the upper roller electrode 20. This embodiment is particularly useful in a situation where the space problem is further aggravated by a work piece which protrudes just below the weld work area. In the embodiment of FIGURE 3 the element 45 represents a protruding flange which prevents the insertion of an inclined lower electrode such as 22. In lieu of the lower roller electrode 22, the lower electrode 46 is horizontally positioned and is rotatable on bearings 48 supported from the lower carriage 18. The modified wedge 24a is secured to the lower carriage 18 and the roller 20 is rotatably secured thereto in a manner similar to that shown in FIGURE 2. The roller electrode 20 is driven by the driving roller 26 acting upon the race 28. As before, the electrical connections are completed through the roller 26, the electrode 20, the race 28, and the electrode 46. Operation is essentially the same as that of FIGURE 1.

It will be obvious to persons skilled in the art that this invention permits of various modifications. It is intended, therefore, that the invention be limited only by the scope of the following claims as interpreted in the light of the prior art.

What is claimed is:
1. Electric welding apparatus for welding a seam between two sheet metal flanges in a confined space, said apparatus including:
    a pair of rotatably supported roller electrodes, the peripheries of said electrodes intersecting at an acute angle, said flanges being insertable between said intersecting electrodes, at least one of said electrodes having an integral annular race thereon adjacent its periphery; and
    weld pressure applying means comprising a driving roller driven in contact with said race at a position between the point of intersection of said pair of roller electrodes and the axis of rotation of said one electrode for rotating said electrode and means for varying the contact pressure between said roller and said race.
2. The invention as defined in claim 1 wherein the roller electrode having said annular race is rotatably supported on an insulating wedge.
3. Electric welding apparatus for welding a seam between two sheet metal flanges in a confined space, said apparatus including:
    a pair of circular roller electrodes, said electrodes being rotatably supported on their axes from the opposite surfaces of an insulating wedge, the pe- ripheries of said electrodes intersecting at an acute angle, said flanges being insertable between said intersecting electrodes, each of said electrodes having an integral annular race thereon adjacent its periphery;

weld pressure applying means comprising first and second driving rollers each in contact with a respective one of said races on the radius between said axes and the point of intersection of said pair of roller electrodes, means for varying the contact pressure between said rollers and said races; and means for rotatably driving at least one of said driving rollers for rotating said electrodes.

4. The invention as defined in claim 2 and an electric welding current circuit connected through said driving rollers and each of said roller electrodes and said work.

5. The invention as defined in claim 3 and an electric welding current circuit connected through said driving rollers and each of said roller electrodes and said work.

References Cited

UNITED STATES PATENTS 2,452,498  10/1948  Schwartz _____ 219—81

FOREIGN PATENTS 282,960  1/1928  Great Britain.

JOSEPH V. TRUHE, Primary Examiner

B. A. STEIN, Assistant Examiner

U.S. Cl. X.R.

219—84